United States Patent [19]
Ogiri et al.

[11] Patent Number: 5,448,340
[45] Date of Patent: Sep. 5, 1995

[54] IMAGE READING DEVICE WITH DUAL EXPOSURE MODES

[75] Inventors: Tadakazu Ogiri; Hiroyuki Tanaka; Junji Joma; Toshiharu Nakai; Motohisa Miyazaki; Hiroyuki Arima; Junichi Inada, all of Osaka, Japan

[73] Assignee: Mita Industrial Co., Ltd., Japan

[21] Appl. No.: 151,126

[22] Filed: Nov. 12, 1993

[30] Foreign Application Priority Data

Nov. 27, 1992 [JP] Japan .................................. 4-319003

[51] Int. Cl.⁶ ........................ H04N 1/10; G03G 15/04
[52] U.S. Cl. ...................................... 355/233; 355/50; 358/496; 358/497
[58] Field of Search ............................ 355/233, 50, 75; 358/496, 497, 474, 494, 498

[56] References Cited

U.S. PATENT DOCUMENTS

4,739,376  4/1988  Kanekol ................................ 355/75
5,339,139  8/1994  Fullerton et al. ................. 355/75 X Primary Examiner—Joan H. Pendegrass
Attorney, Agent, or Firm—Beveridge, DeGrandi, Weilacher & Young

[57] ABSTRACT

An image scanner serving as an image reading device reads an image of an original by an image sensor. A first read mode in which an image of a stationary on a transparent platen is read by moving the image sensor and a second read mode in which an image of a original read by the image sensor when stationary. An original section is separated from the automatic original conveying section, and can be opened or closed by a small operating force. In the second read mode, an original set on an original tray mounted on an upper portion of the original pressing section is reversed in the automatic original conveying section and then, is discharged to a discharge stand on an upper surface of the original pressing section. The original tray is not projected toward the side of the image scanner.

5 Claims, 6 Drawing Sheets

FIG. 6

IMAGE READING DEVICE WITH DUAL EXPOSURE MODES

BACKGROUND OF THE INVENTION

Field of the Invention

The present invention relates to an image reading device having a first read mode in which an image of an original put on a transparent platen on an upper surface of the main body of the image reading device is read by moving image reading means and a second read mode in which an original put on an original tray is conveyed by original conveying means and is passed onto the image reading means to read an image of the original when the original passes the image reading means.

Description of the Related Art

In a copying machine or the like having an automatic original conveying function, an automatic original conveying section containing, for example, original conveying means for conveying an original set on an original tray and driving means for driving the original conveying means, and an original pressing section for pressing an original put on a transparent platen on an upper surface of the main body of the copying machine are respectively constituted by frames integrally opened or closed.

However, the frame comprising the heavy automatic original conveying section is relatively heavy in weight, and an operating force in opening or closing the frame so as to set or remove the original onto or from the transparent platen is large, resulting in inferior operability.

On the other hand, an image reading device having a first read mode in which an image of an original put on a transparent platen on an upper surface of the main body of the image reading device is read by moving an image sensor and a second read mode in which an original put on an original tray is conveyed by original conveying means and is passed onto the image sensor to read an image of the original when the original passes the image sensor is provided as an image reading device such as an image scanner.

As to the above described image reading device such as an image scanner, an image reading device in which an original put on an original tray on one side of original conveying means is conveyed to a discharge tray on the other side of the original conveying means without being reversed (so-called straight path) has been conventionally known. Since the tray is projected toward the side of the image scanner, however, the space where the device is installed is increased.

Furthermore, even when the automatic original conveying function of the above described copying machine is applied to the image reading device such as the image scanner, the occurrence of the problem of inferior operability is similarly expected.

SUMMARY OF THE INVENTION

An object of the present invention is to solve the above described technical subject and to provide an image reading device which is small in size and is superior in operability.

According to one embodiment of the present invention, an image reading device having a first read mode in which an image of an original put on a transparent platen on an upper surface of the main body of the image reading device is read by moving image reading means and a second read mode in which an original put on an original tray is conveyed by original conveying means and is passed onto the image reading means to read an image of the original when the original passes the image reading means is characterized by comprising an automatic original conveying section comprising the original conveying means and mounted on one side part of the upper surface of the main body of the image reading device, and an original pressing section disposed adjacent to the automatic original conveying section in a separated state, supported rotatably around an axis along a rear edge of the upper surface of the main body of the image reading device between a closed position where the original put on the transparent platen is covered and an opened position where an upper portion of the transparent platen is exposed, and having a discharge stand to which the original whose image has been read in the second read mode is conveyed by the original conveying means formed on its upper surface, and in that the original tray is mounted on an upper portion of the original pressing section so that the original put on the original tray in the second read mode is reversed and is conveyed onto the discharge stand.

According to the above described embodiment, only the original pressing section can be opened or closed in a state where it is separated from the automatic original conveying section which is relatively heavy in weight because it comprises the original conveying means and the like. Consequently, in putting the original on the transparent platen in the first read mode, an opening or closing operation can be performed by a much smaller operating force, as compared with a case where the original pressing section and the automatic original conveying section are integrally opened or closed as in the conventional example. In addition, the original put on the original tray is reversed and is conveyed onto the discharge stand on the upper surface of the original pressing section (so-called boomerang conveyance), so that the original tray is not projected toward the side of the image reading device, thereby to make it possible to miniaturize the image reading device.

Furthermore, according to a preferred embodiment, the original reading device is characterized in that the original tray is supported rotatably around an axis along a side edge on the side of the automatic original conveying section of the original pressing section between a set position where the original is put on its upper surface in a state where an upper portion of the discharge stand is almost covered and a non-set position where the upper portion of the discharge stand is almost exposed.

According to this embodiment, the original tray is rotated from the set position to the non-set position, thereby to make it possible to expose the upper portion of the discharge stand. Consequently, the original discharged onto the discharge tray can be easily removed.

Furthermore, according to a preferred embodiment, the original reading device is characterized by further comprising original tray position control means for moving the original tray to the non-set position at predetermined timing after the conveyance of the original from the original tray and further returning the original tray to the set position at predetermined timing after an elapse of a predetermined time period.

According to the above described embodiment, the original tray position control means moves the original tray to the non-set position at predetermined timing after the conveyance of the original from the upper surface of the original tray in the set position, so that the upper portion of the discharge stand on the upper surface of the original pressing section is automatically exposed, thereby to make it possible to remove the original discharged onto the discharge stand more easily. Thereafter, the original tray position control means moves the original tray to the set position, to enter the wait state for setting the subsequent original.

According to a more preferred embodiment, the original reading device is characterized by further comprising discharged original detecting means for detecting the presence or absence of the original on the discharge stand, and in that the original tray position control means moves the original tray to the non-set position in accordance with the detection of the original by the discharged original detecting means.

According to this embodiment, the original tray is rotated to the non-set position in accordance with the detection of the original by the discharged original detecting means. The original tray is not rotated until the discharge of the original is confirmed, thereby to eliminate the possibility that the original tray is uselessly rotated when the original is jammed, for example.

According to a still more preferred embodiment, the original reading means is characterized in that the original tray position control means comprises a swing lever engaged with a predetermined portion of the original tray in a state where the original pressing section is in the closed position and swung by driving means to move the original tray to the set position and the non-set position, and the original pressing section is provided with a relief portion for avoiding the interference between the original pressing section and the swing lever when the original pressing section is opened or closed.

According to this embodiment, the original tray mounted on the original pressing section is engaged with the swing lever by only closing the original pressing section, so that the original tray enters a rotatable state. Moreover, the interference between the original pressing section opened or closed and the swing lever can be avoided by a simple structure in which the original pressing section is only provided with the relief portion. Consequently, the increase in the manufacturing cost caused by employing a mechanism for automatically adjusting the position of the original tray can be kept low.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

An embodiment will be described in detail with reference to the drawings.

Figure 3:
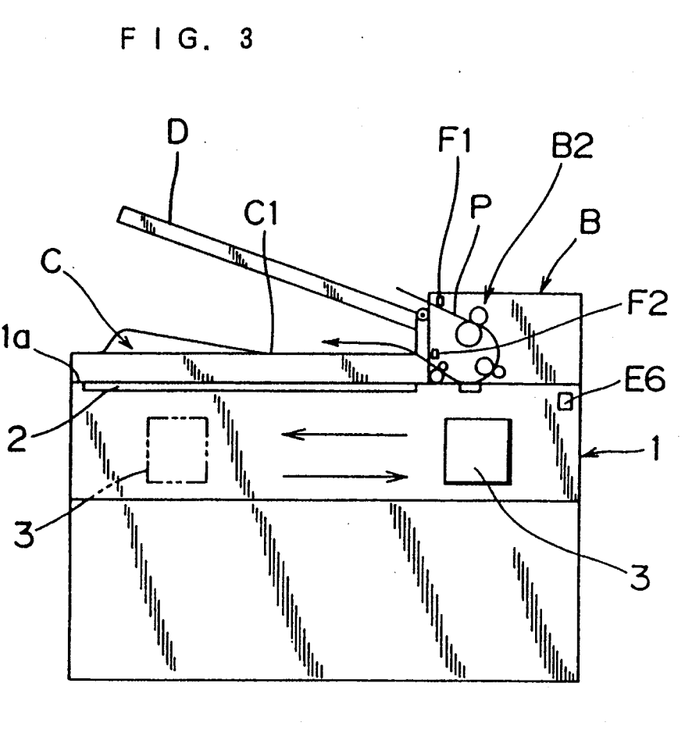
FIG. 3 is a schematic side view showing the internal construction of the image reading device.

Referring to FIG. 3, in an image scanner A serving as an image reading device, a first read mode and a second read mode are set.

In the first read mode, an image sensor 3 serving as image reading means is moved parallel to a transparent platen 2 on an upper surface 1a of a scanner body 1 (indicated by a two-dot and dash line in FIG. 3), to read an image of an original put on the transparent platen 2.

On the other hand, in the second read mode, an image of a passed original conveyed by a group of conveying rollers B2 serving as original conveying means in an automatic original conveying section B as described later is read by the image sensor 3 in a state where the image sensor 3 stands still in a position for reading just below the automatic original conveying section B (indicated by a solid line in FIG. 3).

Figure 4:
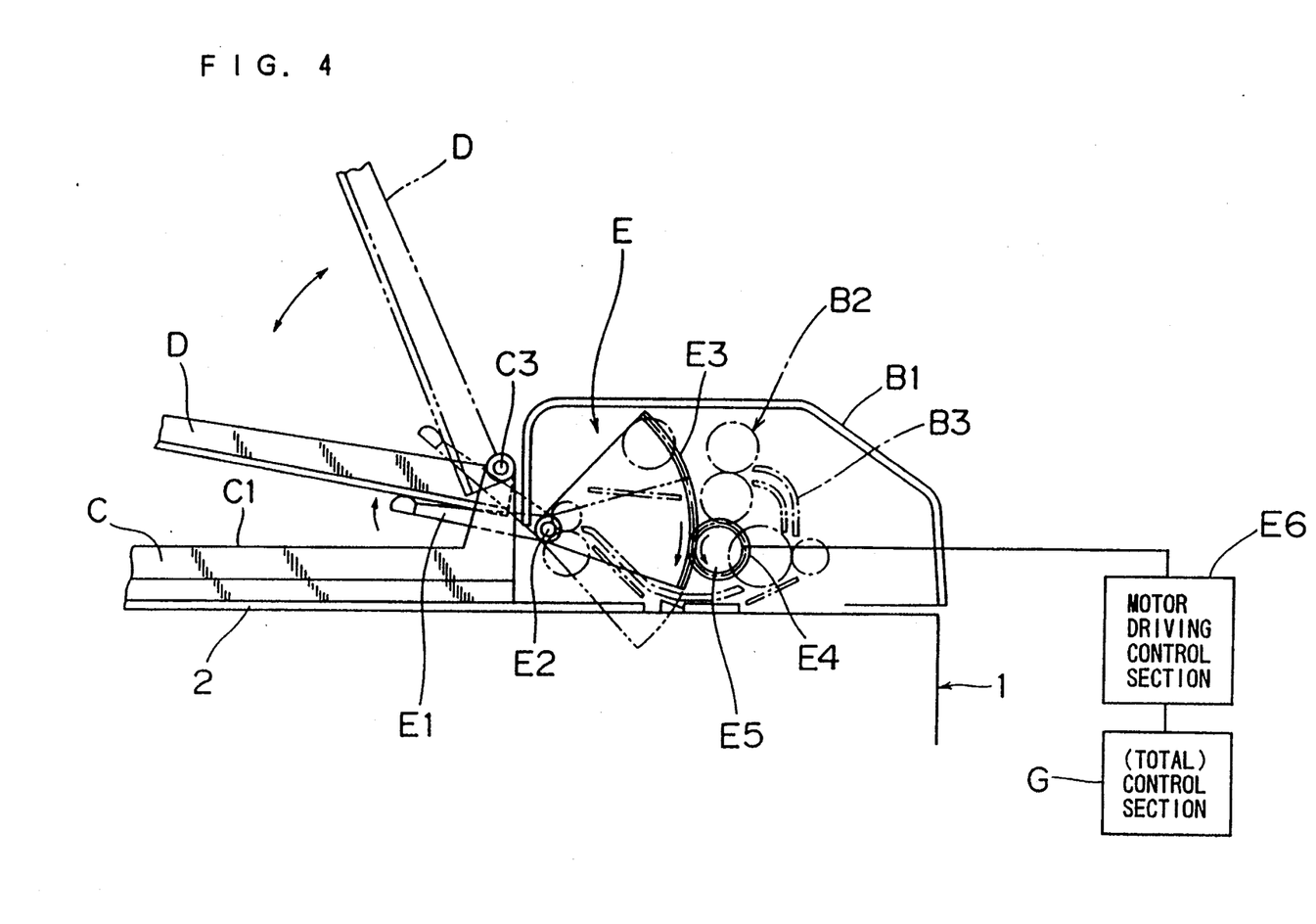
FIG. 4 is a schematic side view showing main sections in the image reading device.

Reading operations in each of the read modes are controlled by a control section G (see FIG. 4). A set original detecting switch F1 serving as a set original detecting means for detecting the presence or absence of an original on an original tray D is disposed in a portion on the most upstream side of a conveying path P inside the automatic original conveying section B. In addition, a discharged original detecting switch F2 serving as a discharged original detecting means for detecting the presence or absence of an original on a discharge stand C1 is disposed in a portion on the most downstream side of the conveying path P. The switches F1 and F2 are respectively limit switches for outputting an on or off signal.

Figure 1:
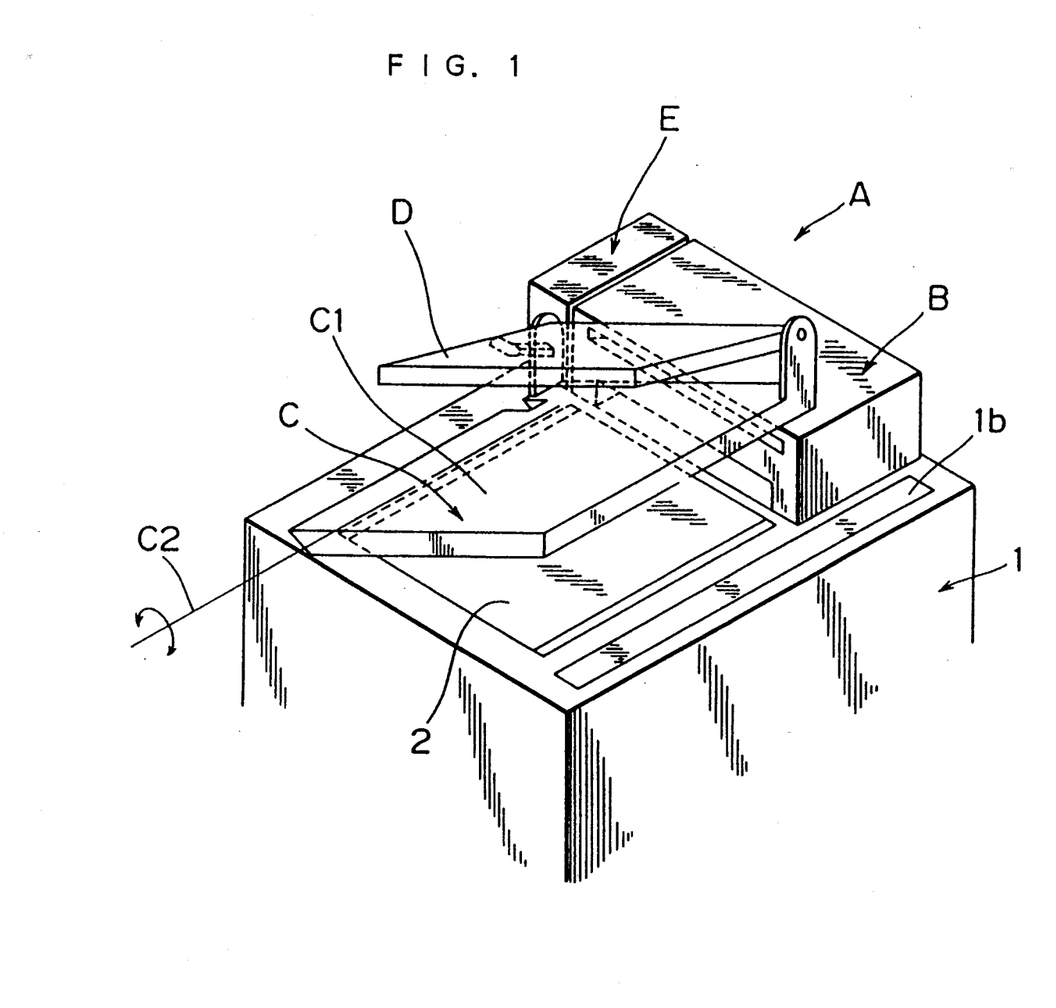
FIG. 1 is a schematic perspective view showing a state where an original pressing section is opened in an image reading device according to one embodiment of the present invention.
Figure 2:
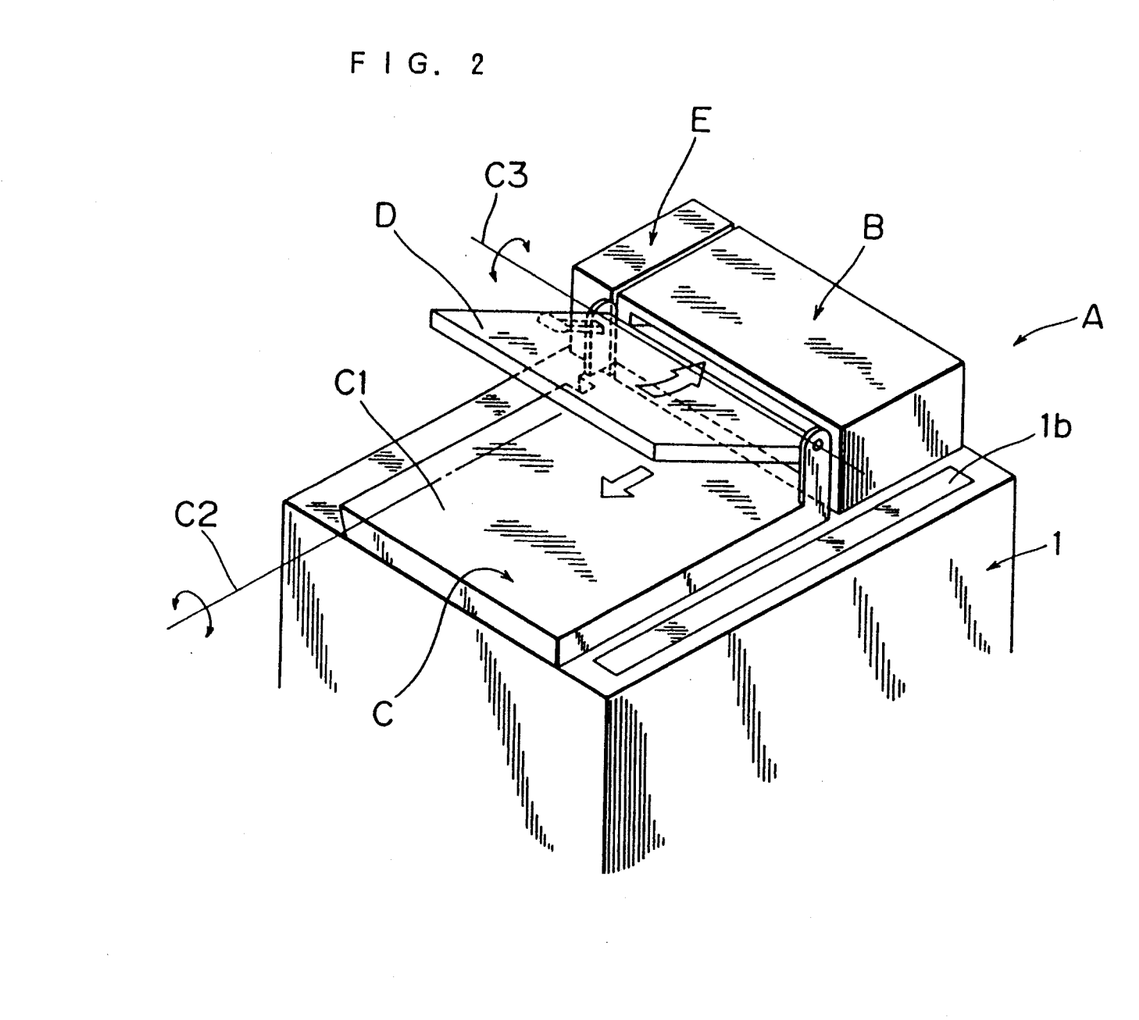
FIG. 2 is a schematic perspective view showing a state where the original pressing section is closed in the image reading device.

Referring to FIGS. 1 and 2, the image scanner A comprises i) the above described automatic original conveying section S which is immovably mounted at one end of the upper surface 1a of the scanner body 1, ii) an original pressing section C which is disposed adjacent to the automatic original conveying section B in a separated state and can be opened or closed, iii) an original tray D which is rotatably mounted on a predetermined portion of the original pressing section C and on which the original is set in the second read mode, and iv) an original tray position control device for controlling the position for rotation of the original tray D. An operating section 1b having a plurality of operating switches disposed therein is provided at a front end of the upper surface 1a of the scanner body 1.

Figure 5:
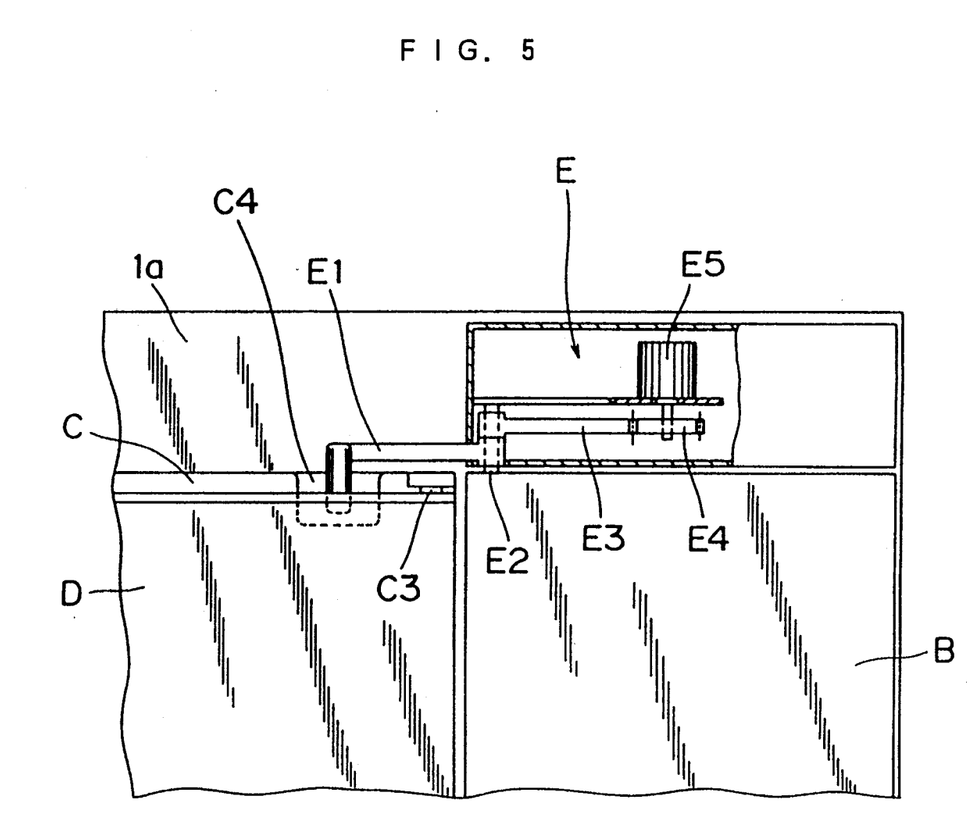
FIG. 5 is a schematic plan view showing main sections in the image reading device.

Referring to FIG. 4 and FIG. 5, the above described automatic original conveying section B is constructed as a unit including, for example, the above described group of conveying rollers B2 for conveying the original into the casing B1 and a guide plate B3 for guiding the conveyance of the original.

The above described original pressing section C is supported rotatably around an axis C2 along a rear edge of the upper surface 1a of the scanner body 1, and is moved in a state where it is separated from the automatic original conveying section B by the rotation between a closed position where the original put on the transparent platen 2 is covered (see FIG. 2) and an opened position where an upper portion of the transparent platen 2 is exposed (see FIG. 1). The original pressing section C can be rotated to a state where it stands almost upright, although the opening thereof is small in FIG. 1. In addition, a discharge stand C1 to which the original whose image has been read in the second read mode is conveyed by the group of conveying rollers B2 is formed on an upper surface of the original pressing section C.

The original tray D on which the original is to be put in the second read mode is mounted on the original pressing section C. The original put on this original tray D is conveyed by the group of conveying rollers B2, is reversed, and is discharged onto the discharge stand C1 (so-called boomerang conveyance). In order to achieve the boomerang conveyance, the conveying path P in the automatic original conveying section B is curved in an approximately U shape as shown in FIG. 3.

Furthermore, the original tray D is supported rotatably around an axis C3 along a side edge on the side of the automatic original conveying section B of the original pressing section C, and is moved by the rotation to a set position where the original is put on its upper surface in a state where an upper portion of the discharge stand C1 is almost covered (indicated by a solid line in FIG. 4) and a non-set position where the upper portion of the discharge stand C1 is almost exposed in a state where it stands almost upright (indicated by a two-dot dash line in FIG. 4).

An original tray position control device E for carrying out such control that the above described original tray D is moved to the set position and the non-set position is provided behind the above described automatic original conveying section B. Referring to FIGS. 4 and 5, the original tray position control device E has i) a swing lever E1 engaged with a predetermined portion of the original tray D in a state where the original pressing section C is in a closed position for moving the original tray to the set position and the non-set position, ii) a fan-shaped gear E3 rotated around an axis E2 integrally with the swing lever E1, iii) a transmission gear E4 engaged with the fan-shaped gear E3 and a motor E5 serving as driving means for driving the transmission gear E4, and iv) a driving control section E6 connected with the control section G (see FIG. 4) for controlling the driving of the forward and reverse rotation of the motor E5 (see FIG. 3).

This driving control section E6 controls the driving of the motor E5 so as to move the original tray D to the non-set position at predetermined timing after the conveyance of the original from the original tray D and further return the original tray D to the set position at predetermined timing after an elapse expiration of a predetermined time period.

The above described original pressing section C is provided with a relief portion C4 for avoiding interference between the original pressing section C and the swing lever E1 when the original pressing section C is opened or closed (see FIG. 5).

Figure 6:
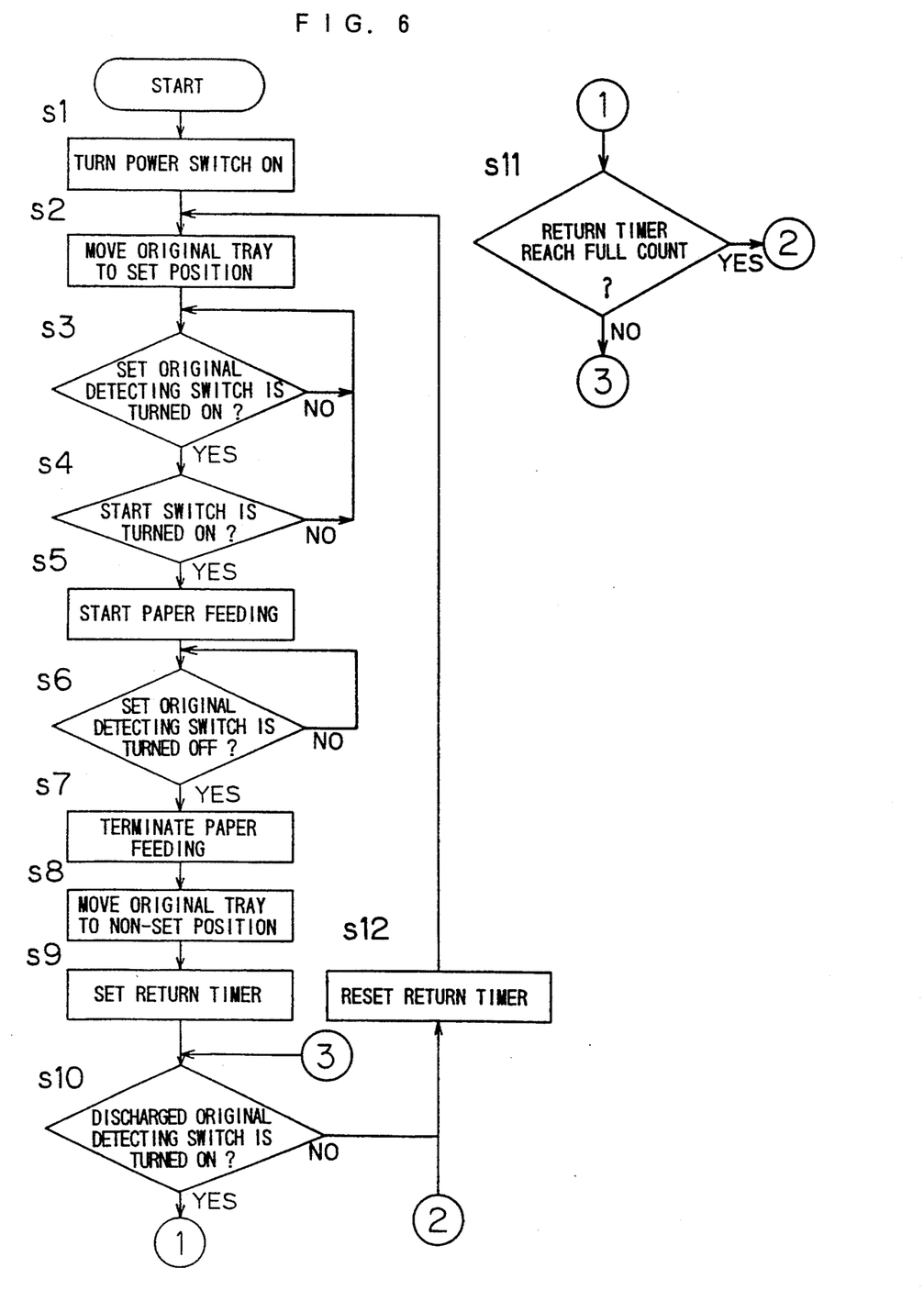
FIG. 6 is a flow chart showing the flow of control.

Referring now to a flow chart of FIG. 6, description is made of reading operations. When a power switch is turned on (step s1), the original tray D is initialized to the lower set position (step s2). In the step s3, it is then judged on the basis of a signal from the set original detecting switch F1 whether or not there is an original on the original tray D. If it is judged that there is an original on the original tray D because the set original detecting switch F1 is turned on, it is judged that the second read mode is selected, so that the program proceeds to the step s4. In the step s4, it is judged whether a start switch is turned on or off. If there is no original on the original tray D and if the start switch is not turned on, the steps s3 and s4 are repeated. That is, the group of conveying rollers B2 is not driven to start paper feeding until the original is set on the original tray D and the start switch is turned on.

In the step s6, it is then judged depending on whether the set original detecting switch F1 is turned off whether or not the conveyance of the original from the original tray D is terminated. If the set original detecting switch F1 is turned off, it is judged that the conveyance of the original from the original tray D is terminated, so that the group of conveying rollers B2 is stopped to terminate the paper feeding after an elapse of a predetermined time period from this timing at which the set original detecting switch F1 is turned off. The time when the set original detecting switch F1 is switched from the on state to the off state is timing at which the rear edge of the original passes on the set original detecting switch F1. If the driving of the group of conveying rollers B2 is stopped (the paper feeding is terminated) after a predetermined time period from this timing, therefore, the original can be conveyed onto the discharge tray C1.

After the paper feeding is terminated, the original tray position control device E then moves the original tray D from the set position to the non-set position in a state where it stands almost upright, to expose the upper portion of the discharge stand C1. Consequently, the original discharged to the discharge stand C1 can be easily taken out. Timing at which the original tray position control device E moves the original tray D to the non-set position is timing after an elapse of a predetermined time period from the above described timing at which the set original detecting switch F1 is turned off.

Thereafter, a return timer (a timer for returning the original tray D in the non-set position to the set position) is set (step s9). It is then judged in the step s10 on the basis of a signal from the discharged original detecting switch F2 whether or not the original is discharged to the discharge stand C1. If it is judged in the step s10 that the original is discharged to the discharge stand C1 because the discharged original detecting switch F2 is turned on, the program proceeds to the step s11. In the step s11, it is judged whether or not a counted number of the return timer reaches not less than a predetermined number (whether or not a predetermined time period has elapsed since the return timer reached the full count). If a predetermined time period has elapsed, the return timer is reset (step s12) and then, the program is returned to the step s2. On the other hand, if a predetermined time period has not elapsed yet, the program is returned to the step s10.

When the discharged original detecting switch F2 is not turned on in the step s10, the occurrence of an abnormality such as the stop of the original in the conveying path (a jam or the like) is expected. Accordingly, the return timer is reset (step s12) and then, the program is returned to the step s2. In the step s2, the original tray D is returned to the set position.

According to the present embodiment, when the original is put on the transparent platen 2 in the first read mode, only the original pressing section C can be opened or closed in a state where it is separated from the relatively heavy automatic original conveying section B, so that the original pressing section C can be opened or closed by a small operating force, resulting in superior operability of the original pressing section C. In addition, so-called boomerang conveyance is achieved, so that the original tray D is not projected toward the side of the image reading device A, thereby to make it possible to miniaturize the image reading device A.

The original tray D is rotated from the set position to the non-set position, thereby to make it possible to expose the upper portion of the discharge stand C1. Accordingly, it is possible to easily remove the original which has been discharged to the discharge stand C1 after being fed. Particularly at predetermined timing after the conveyance of the original from the original tray D, the upper portion of the discharge stand C1 is automatically exposed, thereby to make it possible to remove the original discharged to the discharge stand C1 more easily.

Furthermore, a simple structure in Which the original tray D is pushed up by the swing lever E1 is employed as the original tray position control device E, so that the operation is reliably performed, and the increase in the manufacturing cost caused by employing a structure in which the original tray D is automatically rotated can be kept low. In addition, if the above described swing lever E1 is used, the original tray D mounted on the original pressing section C is placed on the swing lever E1 by only closing the original pressing section C, so that the original tray D enters a rotatable state. Moreover, the interference between the original pressing section C opened or closed and the swing lever E1 can be avoided by a simple structure in which the original pressing section C is only provided with the relief portion C4. Also in these respects, the increase in the manufacturing cost can be kept low.

In the above described embodiment, the original tray D can be also opened only manually. In this case, the operability is slightly degraded, as compared with that in the above described embodiment. However, the structure of the original tray position control device can be omitted, thereby to make it possible to lower the manufacturing cost.

Furthermore, the original tray D may be rotated to the non-set position to expose the upper portion of the discharge stand C1 in accordance with the detection of the original by the discharged original detecting switch F2. In this case, the original tray D is rotated after it is confirmed that the original is discharged, so that the original tray D is not uselessly opened when an abnormality such as a jam occurs.

Additionally, timing at which the original tray D is moved to the non-set position may be any timing after the conveyance of the original from the original tray D.

Furthermore, the discharged original detecting switch F2 can be provided on the side of the original pressing section C. In addition thereto, various design changes can be made in the range in which the gist of the present invention is not changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading device having a first read mode in which an image of an original put on a transparent platen on an upper surface of the main body of the image reading device is read by moving an image reading means, and a second read mode in which an original put on an original tray is conveyed by an original conveying means to said image reading means for reading of an image of the original when the original passes the image reading means, comprising:

an automatic original conveying section including said original conveying means and being mounted on one side part of the upper surface of the main body of said image reading device; and an original pressing section disposed adjacent to said automatic original conveying section in a separated state, and supported rotatably around an axis along a rear edge of the upper surface of the main body of said image reading device between a closed position where the original put on said transparent platen is covered and an opened position where an upper portion of the transparent platen is exposed, and having a discharged stand to which the original whose image has been read in the second read mode is conveyed by said original conveying means formed on its upper surface, said original tray being mounted on an upper portion of said original pressing section so that the original put on said original tray in the second read mode is reversed and is conveyed onto said discharge stand.

2. The image reading device according to claim 1, wherein said original tray is supported rotatably around an axis along a side edge on the side of the automatic original conveying section of said original pressing section between a set position where the original is put on its upper surface in a state where an upper portion of said discharge stand is almost covered and a non-set position where the upper portion of said discharge stand is almost exposed.

3. The image reading device according to claim 2, further comprising original tray position control means for moving the original tray to the non-set position at a predetermined time after the conveyance of the original from said original tray, and returning the original tray to the set position at a predetermined time after expiration of a predetermined time period.

4. The image reading device according to claim 3, further comprising discharged original detecting means for detecting the presence or absence of the original on said discharge stand, said original tray position control means moving the original tray to the non-set position in accordance with the detection of the original by said discharged original detecting means.

5. The image reading device according to claim 3, wherein said original tray position control means includes a swing lever engaged with a predetermined portion of said original tray in a state where said original pressing section is in the closed position and swung by driving means to move said original tray to the set position and the non-set position, and said original pressing section is provided with a relief portion for avoiding interference between the original pressing section and said swing lever when the original pressing section is opened or closed.

* * * * *